United States Patent
Sheaffer et al.

(10) Patent No.: US 8,806,101 B2
(45) Date of Patent: Aug. 12, 2014

(54) METAPHYSICAL ADDRESS SPACE FOR HOLDING LOSSY METADATA IN HARDWARE

(75) Inventors: Gad Sheaffer, Hafia (IL); Shlomo Raikin, Geva Carmel (IL); Vadim Bassin, Raanana (IL); Raanan Sade, Kibutz Gvat (IL); Ehud Cohen, Motskin (IL); Oleg Margulis, Hafia (IL)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 12/346,500

(22) Filed: Dec. 30, 2008

(65) Prior Publication Data

US 2010/0169382 A1    Jul. 1, 2010

(51) Int. Cl.
*G06F 12/06* (2006.01)
*G06F 12/08* (2006.01)
*G06F 9/46* (2006.01)

(52) U.S. Cl.
CPC ........ *G06F 12/0615* (2013.01); *G06F 12/0842* (2013.01); *G06F 9/467* (2013.01)
USPC .......... 711/3; 711/144; 711/150; 711/E12.08; 711/E12.039

(58) Field of Classification Search
CPC ................................................. G06F 12/0615
USPC ................................. 711/212, 220, E12.015
See application file for complete search history.

(56) References Cited

U.S. PATENT DOCUMENTS

| | | | |
|---|---|---|---|
| 5,008,813 A * | 4/1991 | Crane et al. | 711/119 |
| 5,301,294 A | 4/1994 | Kawai et al. | |
| 6,549,996 B1 | 4/2003 | Manry, IV et al. | |
| 2003/0005219 A1 * | 1/2003 | Royer, Jr. et al. | 711/113 |
| 2003/0204670 A1 * | 10/2003 | Holt et al. | 711/112 |
| 2004/0064813 A1 | 4/2004 | Neiger et al. | |
| 2005/0060495 A1 * | 3/2005 | Pistoulet | 711/118 |
| 2005/0246487 A1 * | 11/2005 | Ergan et al. | 711/113 |
| 2006/0248259 A1 * | 11/2006 | Ryu et al. | 711/1 |
| 2007/0061511 A1 * | 3/2007 | Faber | 711/113 |
| 2007/0245309 A1 * | 10/2007 | Gray et al. | 717/115 |

(Continued)

FOREIGN PATENT DOCUMENTS

WO    2010/077842 A2    7/2010

OTHER PUBLICATIONS

Bruce Jacob et al. Memory Systems: Cache, DRAM, Disk. Sep. 2007. Morgan Kaufmann. pp. 92-97.*

(Continued)

*Primary Examiner* — Nathan Sadler
(74) *Attorney, Agent, or Firm* — Blakely, Sokoloff, Taylor & Zafman LLP (57) ABSTRACT

A method and apparatus for metaphysical address space for holding lossy metadata is herein described. An explicit or implicit metadata access operation referencing data address of a data item is encountered. Hardware modifies the data address to a metadata address including a metaphysical extension. The metaphysical extension overlays one or more metaphysical address space(s) on the data address space. A portion of the metadata address including the metaphysical extension is utilized to search a tag array of the cache memory holding the data item. As a result, metadata access operations only hit metadata entries of the cache based on the metadata address extension. However, as the metadata is held within the cache, the metadata potentially competes with data for space within the cache.

12 Claims, 8 Drawing Sheets

(56) References Cited

U.S. PATENT DOCUMENTS

2008/0040551 A1* 2/2008 Gray et al. .................. 711/130
2009/0158006 A1   6/2009 Nam
2010/0332716 A1* 12/2010 Sheaffer et al. ................ 711/3

OTHER PUBLICATIONS

J. Eliot B. Moss and Antony L. Hosking. "Nested Transactional Memory: Model and Preliminary Architecture Sketches." Oct. 2005. ACM. SCOOL '05.*

IEEE. IEEE 100: The Authoritative Dictionary of IEEE Standards Terms. Dec. 2000. IEEE. pp. 1255.*

Maurice Herlihy et al. "Software Transaction Memory for Dynamic-Sized Data Structures." Jul. 2003. ACM. PODC'03. pp. 92-101.*

Maurice Herlihy et al. "Transactional Memory: Architectural Support for Lock-Free Data Structures." May 1993. ACM. ISCA '93. pp. 289-300.*

C. Scott Ananian et al. "Unbounded Transactional Memory." Feb. 2005. IEEE. HPCA-11. pp. 316-327.*

Office Action Received for Chinese Patent Application No. 200910113666.7 mailed on May 25 2011, 9 Pages of Office Action including 6 pages of English Translation.

International Preliminary Report on Patentability received for PCT Application No. PCT/US2009/067983, Mailed on Jul. 14, 2011, 6 pages.

International Search Report and Written Opinion received for PCT Application No. PCT/US2009/067983, mailed on Jul. 27, 2010, 9 pages.

* cited by examiner

FIG. 6

METAPHYSICAL ADDRESS SPACE FOR HOLDING LOSSY METADATA IN HARDWARE

FIELD

This invention relates to the field of processor execution and, in particular, to execution of groups of instructions.

CROSS REFERENCE TO RELATED APPLICATIONS

This application is related to the following patent applications filed herewith: U.S. Publication No. 2010/0169894, entitled "Registering a User-Handler in Hardware for Transactional Memory Event Handling," by Gad Sheaffer et al., filed on Dec. 30, 2008; U.S. Publication No. 2010/0169580, entitled "Memory Model for Hardware Attributes Within a Transactional Memory System," by Gad Sheaffer et al., filed on Dec. 30, 2008; U.S. Publication No. 2010/0169579, entitled "Read and Write Monitoring Attributes in Transactional Memory (TM) Systems," by Gad Sheaffer et al., filed on Dec. 30, 2008; and U.S. Publication No. 2010/0169581, entitled "Extending Cache Coherency Protocols to Support Locally Buffered Data," by Gad Sheaffer et al., filed on Dec. 30, 2008.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes Software Transactional Memory (STM), where tracking of memory accesses, conflict resolution, abort tasks, and other transactional tasks are performed in software, often without the support of hardware.

Another type of transactional execution includes a Hardware Transactional Memory (HTM) System, where hardware is included to support access tracking, conflict resolution, and other transactional tasks. Previously, actual memory arrays were extended with additional bits to hold information, such as hardware attributes to track reads, writes, and buffering, and as a result, the data travels with the data from the processor to memory. Often this information is referred to as persistent, i.e. it is not lost upon a cache eviction, since the information travels with data throughout the memory hierarchy. Yet, this persistency imposes more overhead throughout the memory hierarchy system.

Other previous attempts of storing similar information have been implemented through extension or addition of other structures separate from a data array, which are often to hold lossy information, i.e. information to be lost upon eviction as the information does not travel with data through out a memory hierarchy. However, the additional structures to hold this data are potentially expensive.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware structures for transactional execution, specific types and implementations of access monitors, specific cache implementations, specific types cache coherency models, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, specific compiler methods/implementations, and specific operational details of microprocessors, have not been described in detail in order to avoid unnecessarily obscuring the present invention.

The method and apparatus described herein are for supporting a metaphysical address space for holding lossy metadata. Specifically, a metaphysical address space for metadata is primarily discussed in reference to a supporting a transactional memory system. However, the methods and apparatus for supporting metaphysical address space for holding metadata is not so limited, as they may be implemented in memory architecture to hold metadata for associated data items.

Figure 1:
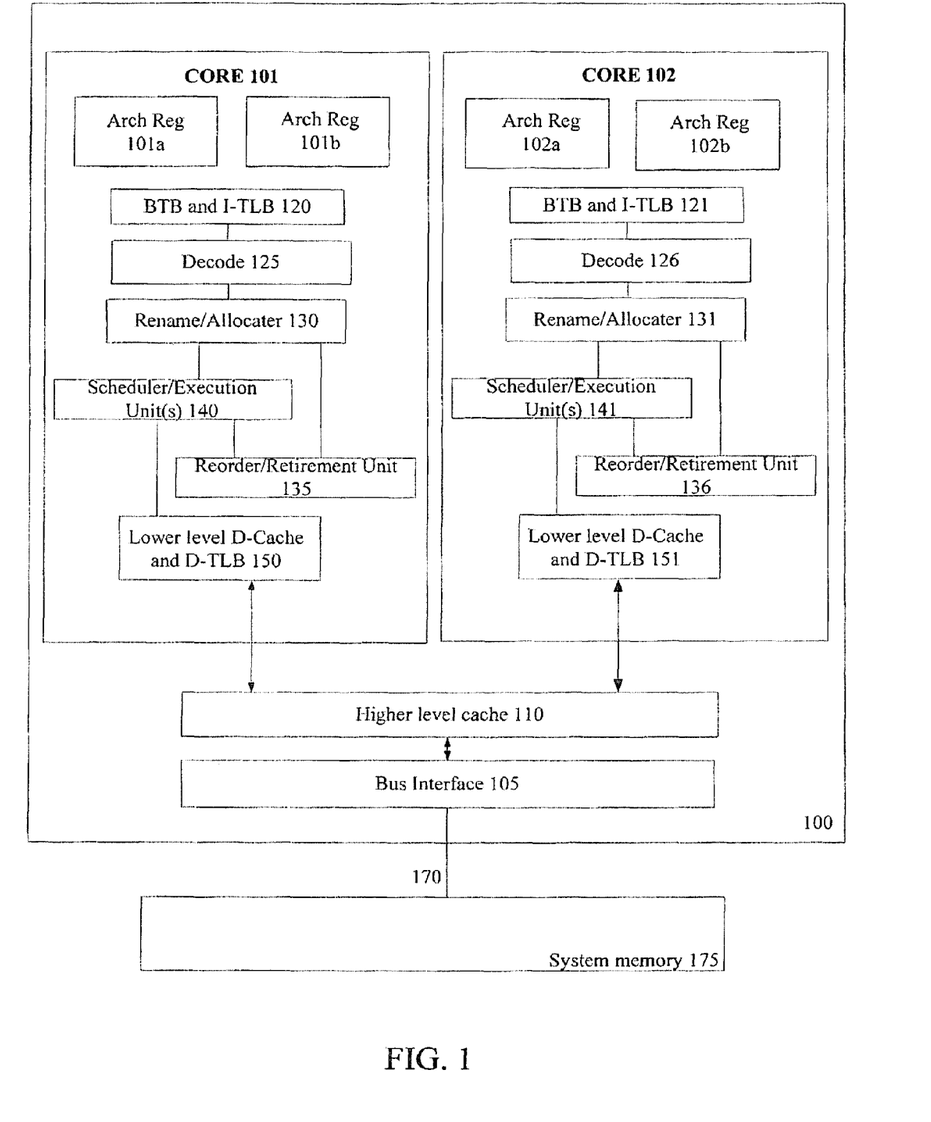
FIG. 1 illustrates an embodiment of a processor including multiple processing elements capable of executing multiple software threads concurrently.

Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a Software Transactional Memory (STM), separate execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

Accesses and requests may be made to data items both by local processing elements, as well as potentially by other processing elements. Without safety mechanisms in a transactional memory system, some of these accesses would potentially result in invalid data and execution, i.e. a write to data invalidating a read, or a read of invalid data. As a result, processor 100 potentially includes logic to track or monitor memory accesses to and from data items for identification of potential conflicts.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, monitors include read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately. An example of utilizing read monitors/attributes to monitor data items is discussed in more detail in co-pending application, U.S. Publication No. 2010/0169579, entitled "Read and Write Monitoring Attributes in Transactional Memory (TM) Systems," by Gad Sheaffer et al., filed on Dec. 30, 2008. However, monitors, attributes, annotations, or other tracking mechanisms may be utilized to detect conflicts associated with transactional execution utilizing any granularity of data or structures to hold the data.

Read or write attributes include any logic, firmware, or structure for holding states associated with data items. For example, attributes for a data item include a bit vector, where each bit in the bit vector represents an attribute of a data item, such as transactionally loaded, transactionally written, non-transactionally loaded, non-transactionally written, not transactionally loaded, not transactionally written, not non-transactionally loaded, not non-transactionally written, access conflict detected, no access conflict detected, a read request, no read request, a write request, no write request, an ownership request, no ownership request, or any other attribute or state associated with a data item or memory location to hold the data item. As another example, the attributes for a data item includes an encoded value. For example, states, such as the four states: (1) transactionally written; (2) transactionally read; (3) not transactionally written; and (4) not transactionally read, are encoded utilizing two attribute bits, i.e. four binary values of 00, 01, 11, and 10.

Based on the design, different combinations of cache coherency requests and monitored coherency states of cache lines result in potential conflicts, such as a cache line holding a data item being in a shared read state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting.

In one embodiment, metadata, such as an attribute or property, for data is held locally in memory. As an example, data is cached in an entry of a cache memory, while metadata for the data is held in another entry of the cache. Even though, in this example, metadata potentially competes with data for space in the cache memory, the ability to hold metadata locally without additional extensions to the data array or additional separate storage structures potentially results in efficient support for metadata without expensive cost of proliferating persistent metadata throughout a memory hierarchy or adding additional storage structures.

In one embodiment, the physical mapping of metadata to data in hardware is not directly visible to software. As a result, metadata access operations, in this example, reference data addresses and relies on the hardware to perform the correct translations, i.e. mapping, to access the metadata appropriately. In one embodiment, one or more metaphysical address space(s) are overlaid on a physical address space for accessing metadata. Essentially, a data address referencing data held in a memory is translated/manipulated to obtain a metadata address, which is utilized to access metadata within the same memory at a different translated location.

To illustrate, a metaphysical value is appended to a data address to obtain a metadata address. Any method of translating a first address to a second address may be utilized. An example of translating a data address to a metadata address includes utilizing a physical address or a virtual address plus addition of a metaphysical value to separate data addresses from metadata address. As another example, a data address may be translated utilizing separate translation tables/logic to obtain a distinct metadata address.

Therefore, a memory may hold metadata for data items in a transparent fashion with regard to the software. When the hardware detects an access operation to metadata, either through explicit operation code (op code of an instruction) or decoding of an instruction into a metadata access micro-operation(s), the hardware performs the requisite translation of the data address referenced by the access operation to access the metadata accordingly. Here, the metadata may be lossy, i.e. the metadata is lost upon a selection of the entry holding the metadata for eviction. However, loss of metadata may be held in a similar manner to handling of conflicts or loss of monitoring attributes, as described in an application filed herewith now having U.S. Publication No. 2010/0169894, entitled "Registering a User-Handler in Hardware for Transactional Memory Event Handling," by Gad Sheaffer et al.

As stated above in the initial reference to FIG. 1, the architecture of processor 100 is purely illustrative for purpose of discussion. Similarly, the specific examples of translating data addresses for referencing metadata is also exemplary, as any method of associating data with metadata in separate entries of the same memory may be utilized.

Figure 2A:
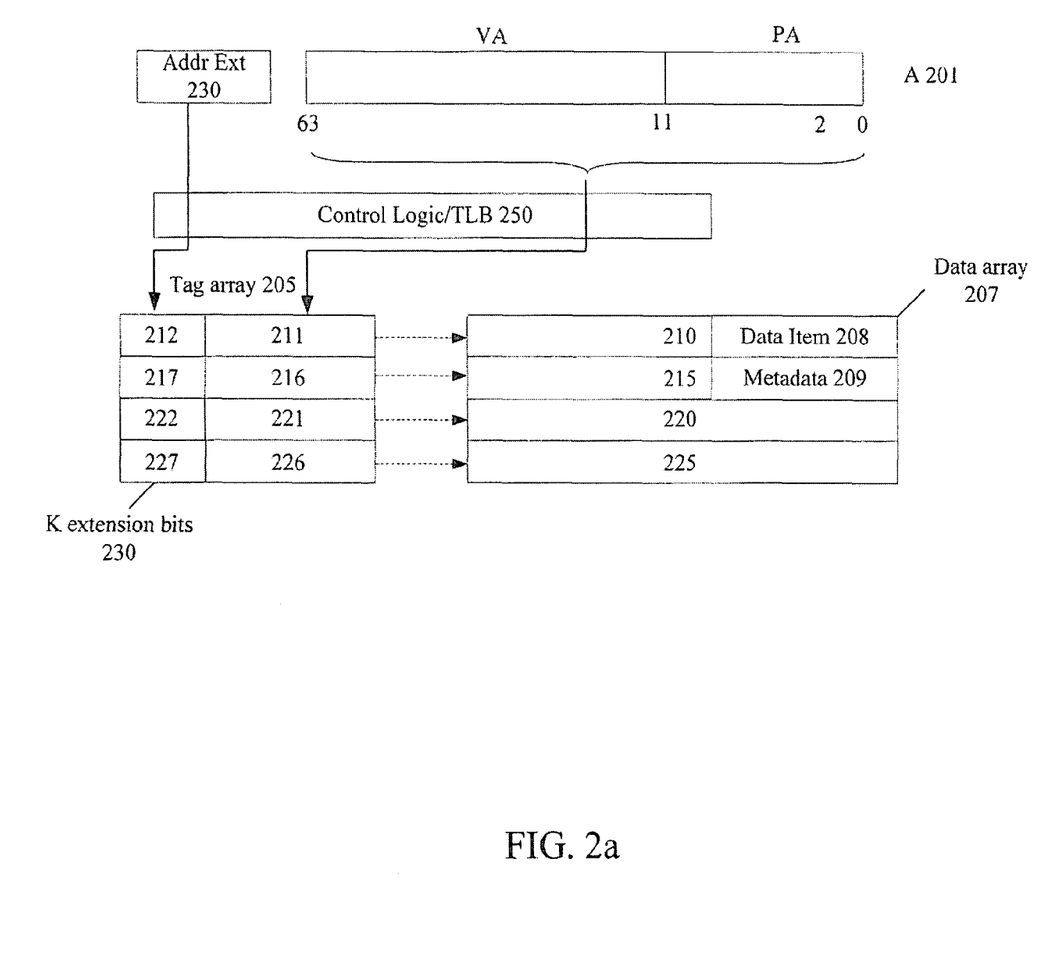
FIG. 2a illustrates an embodiment of a metaphysical address space for holding metadata for data.

Referring to FIG. 2a, an embodiment of a metaphysical address space for holding metadata associated with data is depicted. Portions of a cache memory, such as control logic 250, tag array 205, and data array 207 are illustrated, while specific control circuitry, such as cache lookup, hit, and miss circuits, and other larger structures are not illustrated to simplify the discussion. The most common example of a cache includes a data cache, such as a first level cache or second level cache as illustrated in FIG. 1. However, a cache may also include an instruction cache, trace cache, or other known cache.

Although cache architecture is not described in detail to avoid unnecessarily obscuring the discussion, a cache may be organized in numerous ways. For example, a cache may be fully associative, i.e. memory addresses may be held anywhere in the cache, set associative where certain ranges of memory addresses are restricted to specific sets of the cache, or direct mapped cache where multiple addresses are to be held in single locations within the cache. Note that the methods and apparatus described herein may be implemented with any cache organization.

As illustrated, the cache includes data portion 207, which may also be referred to as a data cache memory or a data array, tag array 205 associated with data array 207, and control logic 230 associated with tag array 205 and data array 207. Data portion 207 includes elements 210, 215, 220, and 225. A cache element, as utilized herein, refers to any granularity of a structural element of a cache, such as a cache line, a cache entry, a cache location, or a cache set. For example, element 210 includes an entry of a plurality of entries, such as a line of a plurality of lines, within a set.

As illustrated, metadata 209 and data item 208, are held in separate entries of data array 207. However, metadata 209 is associated with data item 208 in that it represents attributes or properties of data item 208 and a data address for data item 208, which is associated with entry 210, may utilized as or translated into a metadata address to reference metadata 209 within entry 215. In one embodiment, holding metadata 209 in this manner is considered lossy. In other words, metadata 209 is considered lossy metadata. Essentially, metadata 209 is a local construct, unlike persistent data that tracks data item 208 through a memory hierarchy.

For example, if control logic 250 selects entry 215 for eviction, then metadata 209 is evicted. Since metadata 209 does not exist at a data address location, the information is not maintained or written back to a higher level memory, i.e. metadata 209 is lost. Here, cache control logic 250 may either not perform the write-back due to a cache coherency state of line 215, such as an invalid state, or due to extension field 217 holding a metadata value to indicate entry 215 holds metadata 209, as described in more detail below.

As stated above, metadata 209 includes any attribute, property, or information relating to data item 208. Within a transactional memory system, metadata 209 may be utilized in a number of useful ways. As a first example, metadata 209 includes attributes, such as a read attribute, write attribute, and/or buffering attribute, for data item 208. Here, when data item 208 is transactionally read, metadata 209 is updated to indicate the data item 208 is read monitored, i.e. an external write to data item 208 is then considered a conflict. In this implementation, snoop logic may be modified to perform a snoop of metadata 209 within the entry 215, i.e. a test of metadata within entry 215.

As another example, metadata includes other transaction related information, such as a backup location for transactionally written data item 208, if data item 208 has been previously accessed and/or backed up within a transaction, if data item 208 is associated with an irrevocable/obstinate transaction, if data item 209 has been lost, or other known transaction related descriptive information. Furthermore, as described above, use of metadata is not limited to transactional information. As a corollary, metadata 209 may also include information, properties, attributes, or states associated with data item 208.

As illustrated, tag array 205 includes tag entries 211, 216, 221, and 226, corresponding to data entries 210, 215, 220, 225 of data array 207, respectively. Typically, a tag entry, such as entry 211, is to hold a portion of an address associated with data item 208 held in entry 210. Upon an access to a cache, tag array 205 is searched/looked up utilizing a tag value from the access operation address to index to the correct corresponding entry. In one embodiment, an address, such as address 201, is extended with extension bits to be held in tag array 205 in tag extension fields 212, 217, 222, and 227. Here, an extension field is to hold a value to indicate if a corresponding data entry holds data or metadata. As an example, extension field 212 holds a data value to indicate data, such as data item 208, is held in data entry 210, while extension field 217 holds a metaphysical value to indicate data entry 215 holds metadata, such as metadata 209.

A metaphysical value to be held in an extension field, such as extension field 217, may include any value to denote a corresponding entry holds metadata. Furthermore, the metaphysical value may be provided by hardware, such as a control register or default setting in cache control logic 250, provided by instruction parameter, or a combination thereof.

In one embodiment, extension field 217 is to hold a single bit, such as the Most Significant Bit (MSB), of tag entry 216. Here, when entry 215 holds metadata, then entry 217 holds a first logical value, such as a logical high value. In contrast, extension field 212 holds a second logical value, such as a logical low value, to indicate entry 210 holds data. To illustrate, a simplified example is discussed in the context of the most basic translation method between a data address to a metadata address, i.e. where tag entries 211 and 216 are the same for data item 208 and 209 with only the extension field being different. Here, a portion of address 201, such as a physical address portion is to be held in tag entries of tag array 205.

Assume an access operation referencing a data address for data item 208 is received. Control logic 208 performs a search of tag array 205 to determine if a tag match exists for the data address. Here, if the access operation is a normal data access operation to access data item 208, then the data value is associated with the data address and the search results in a match with entry 211 and extension field 212. Here, a match does not exist between entry 216, as extension field 217 includes a metaphysical value, i.e. a logical one in this example. In contrast, if the access operation includes a metadata access operation, then the metaphysical value of a logical one is appended to the data address and the search results in a hit of entry 216 with extension field 217. Similarly, there is no hit to entry 211, since extension field 212 holds a data value.

As this example illustrates, a program may include separate operations, such as a data access operation or a metadata access operation, that reference the same address of a data item, such as data item 208, and the hardware may map those accesses to different address spaces, such as a physical address space and a metaphysical address space. Where distinct values are utilized in tag entries for data and metadata, the address space are orthogonal, i.e. a metadata access operation does not hit or modify a data entry, since the extension field for a corresponding data entry holding a data item does not match a lookup extension value of a metadata access operation. However, since the metadata and data address space compete for space in the cache, they may affect each other through competition.

In addition, a miss of tag array 205 for a metadata access operation, in one embodiment of lossy metadata, does not service the miss outside the cache memory domain. Essentially, since lossy metadata 209 is held locally within the cache domain, there is no reason to forward the miss externally to service the request. As a result, misses to lossy metadata are potentially serviced in a quick and efficient fashion. As an example, a cache block is allocated for metadata and initialized to a predetermined default value without waiting for an external response.

In addition to the example above, in one embodiment, extension fields of tag array 205 include multiple bits. As a first example, multiple bits in tag array 205 potentially include multiple separate metaphysical address spaces overlaid on the data address space. Here, each bit or grouping of bits correspond to a metaphysical address space for separate metadata, for separate processing elements associated with the same or different metadata, for different parts of a program with the same or different metadata, for different subsystems with the same or different metadata, or for any other known element to associate with an address space.

For example, assume two processing elements, such as two cores, share access to the cache. Here, a first bit of extension field 217 is for a metaphysical address space associated with a first processing element and a second bit of extension field 218 is for a second metaphysical address space associated with a second processing element. Building on the example from above, when a metadata access to data address 201 is encountered for the first processing element, the search of tag array 205 is conducted with the first bit set to the metaphysical logical value, which ensures that a hit to the metaphysical address space for the second processing element does not occur.

Note that in some instances it may be preferable for a processing element to access a different metaphysical address space, such as if the first processing element is to check if an attribute has been set by a second processing element in the second metaphysical address space. In one embodiment, an extension field includes other information. For example, instead of multiple bits for multiple processing elements, a processing element identifier, such as a context ID, may be represented in the multiple bits. Moreover, bits of the extension field may be filled utilizing control register values, instruction parameter values, or other values.

Metadata access operations may include explicit instructions/operations to access data. Here, decoders of a processor may recognize metadata access operations by an operation (op) code of an instruction set architecture. In addition, a larger more complex instruction, when decoded, may include a metadata access micro-operation. To illustrate, an instruction to backup data item 208 is decoded to a first micro-operation to perform a write of a previous version of data item 208 to a back-up location and a second micro-operation to update metadata 209 to hold an address of the back-up location.

As referred to above, in one embodiment, metadata 209 is associated with data item 208 in hardware. As depicted, data item 208 and metadata 209 are uncompressed, i.e. a one to one relationship between metadata and data. In other words, the size of metadata 209 is the same as data item 208. Compression of metadata is discussed in more detail below. Nevertheless, in one embodiment, association of metadata 209 with data item 208 in hardware includes logic to translate a data address indexing into entry 210 for data item 208 to a metadata address indexing into entry 215 for metadata 209. Examples of translation include no translation with addition of a metaphysical value, normal data address translation with addition of a metaphysical value, and separate translation with metaphysical translation logic. This list of non-exhaustive examples of translation of metadata to data is discussed below in more detail in reference to FIGS. 3a-3b.

Figure 2B:
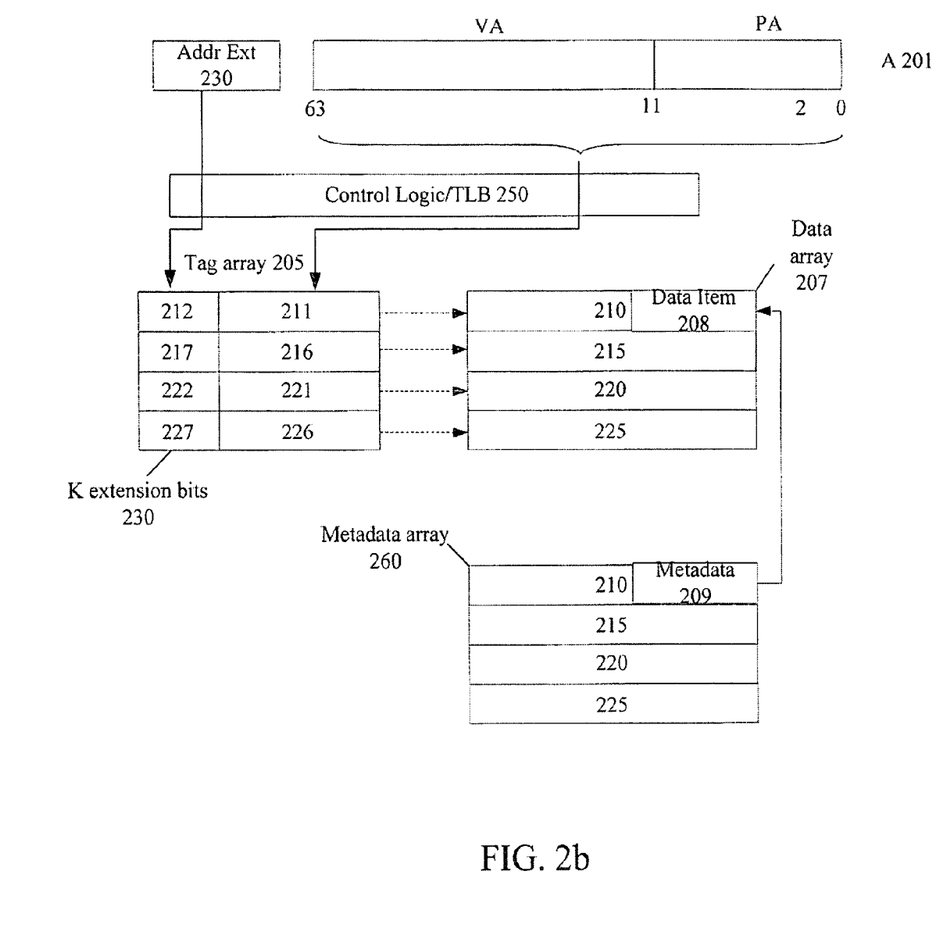
FIG. 2b illustrates another embodiment of a metaphysical address space for holding metadata for data.

With quick reference to FIG. 2b, another embodiment of a metaphysical address space for holding metadata associated with data is depicted. As stated above, metadata, when held in the same array as data, may compete for cache space with the data. Therefore, as depicted in FIG. 2b, in one embodiment, metadata is held in a parallel cache memory 260. Here, the methods and apparatus described above and below, such as obtaining a metadata address from a data address may be performed in the same manner. However, instead of selecting an entry data array 207 for a metadata address, an entry within parallel metadata array 260 is selected. As an example, a multiplexer may be utilized to select between arrays, sets, ways, blocks, etc. based on a metaphysical identifier value, such as a metaphysical value held in address extension 230. Therefore, similar to the description herein, a metadata address may be obtained from a data address of a given data item. However, in this example, selection of an entry is made in parallel array 260, instead of within data array 207. Note that metadata 209 is associated with data item 208 in the same manner, but held in a different physical storage structure.

Figure 3A:
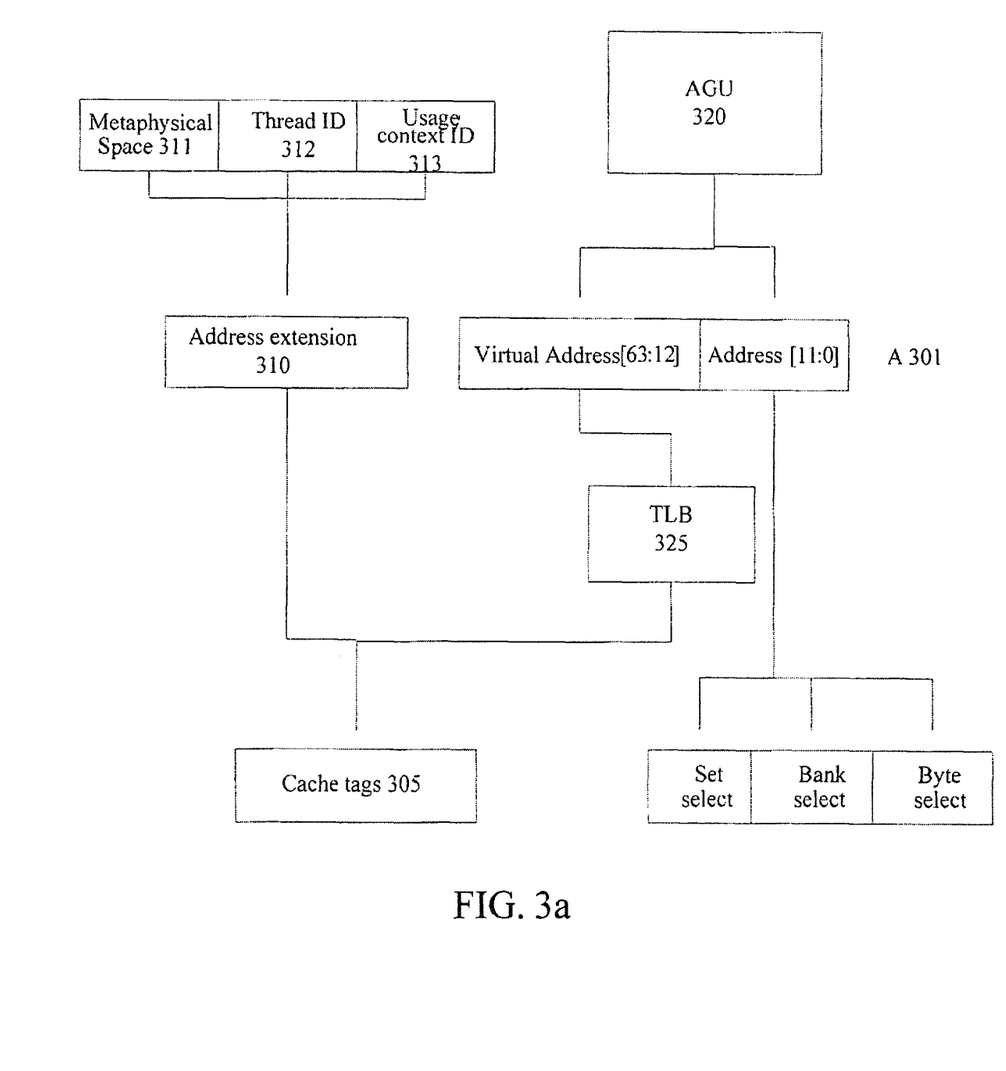
FIG. 3a illustrates an embodiment of structure to support accesses to a metaphysical address space.

Turning to FIG. 3a, an embodiment of structures to support accesses to a metaphysical address space is illustrated. Here, address generation unit (AGU) 320 is to generate addresses, which may be in response to access operations, as described above. Addressing and translation is discussed below in reference to processor utilizing virtual address translation, i.e. a virtual view of physical memory that often utilizes page tables defined in a processor to translate referenced virtual addresses to physical address. However, addressing may be implemented in numerous manners, and accordingly, the methods and apparatus described herein may be implemented utilizing any method of addressing.

In one embodiment, a data item is associated with metadata through translation of data address 301 to a metadata address. As a first example, translation includes extension of data address 301 without traditional translation of a virtual address to physical address. Essentially the virtual address of the data address is utilized for the metadata address. In contrast, a metadata address may be translated in similar manner to data addresses through a translation structure.

As depicted, translation lookaside buffer (TLB) 325 is to translate a virtual address, such as virtual address 201, to a physical address. In some processor architectures, a virtual address and physical address share a portion of the address, such as bits 0-11 for 4K byte pages of address 201. As a first example, the metadata address is the same as the data address. As a result, cache tags in array 305 are the same for data and the associated metadata except for the extension field distinguishing between data and metadata entries.

To illustrate, a quick reference back to FIG. 2a is made. Here, tag entry 216 corresponding to metadata entry 215 is the same as tag entry 211 corresponding to data entry 210. However, extension field 212 holds a data value to indicate entry 210 holds data and extension field 217 holds a metadata value to indicate entry 215 holds metadata. Therefore, upon a cache lookup for a read of metadata 209 from data entry 215 the metadata value is appended to the tag value to hit tag entry 217 corresponding to entry 215. Similarly, with a store operation of metadata 209, entry 215 is allocated in data array 207 with a metaphysical value loaded in extension field 217 based either on an instruction parameter or value held in a register.

Note from the discussion above, that a metadata access, even with the same data address, only hits metadata entries, as the data value, which is held in extension tag entries does not match the appended/extended metadata value. In a scenario where data tag values are not modified other than an extension field, locality of metadata to data is a potentially advantageous. In this example, entries 210 and 215 may be in the same set of a set associative cache due to the portions of the address for selecting a set within data array 207 being the same.

Figure 3B:
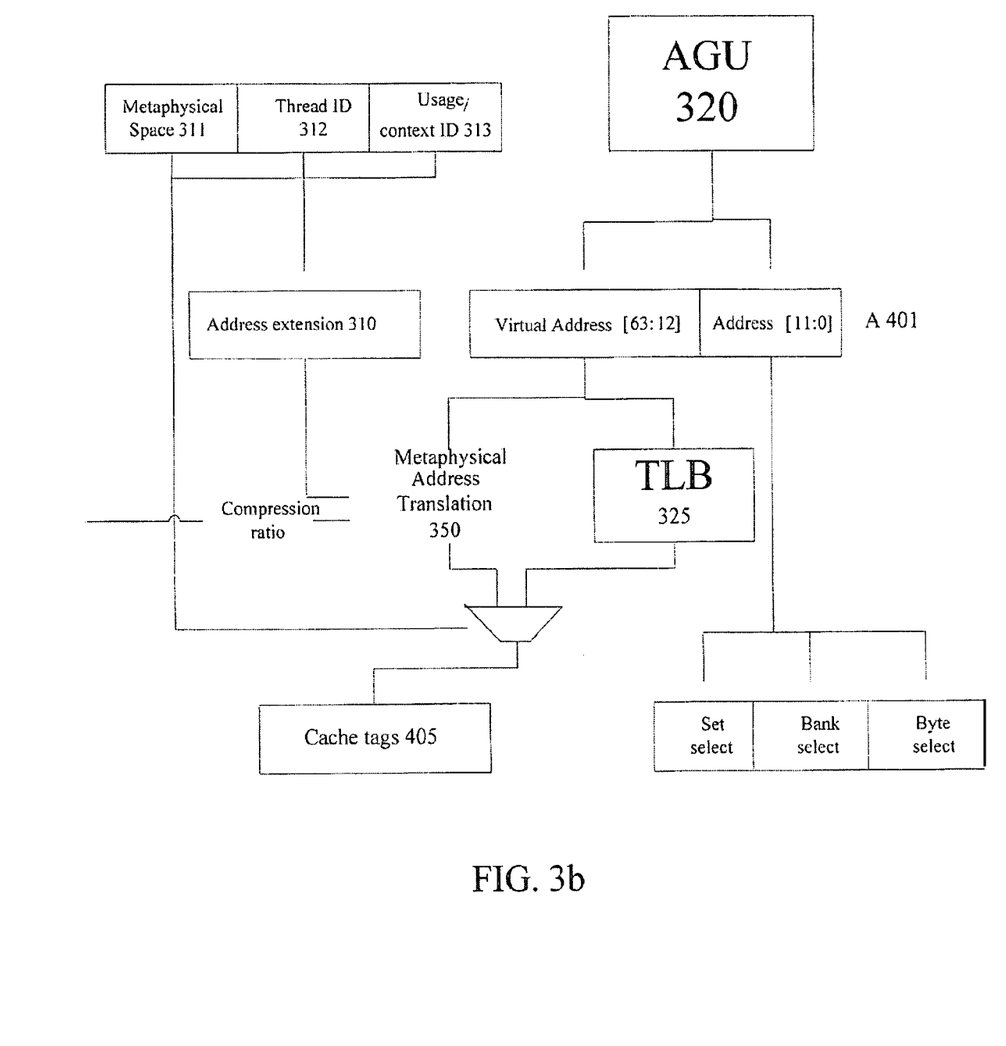
FIG. 3b illustrates another embodiment of structures to support accesses to a metaphysical address space.

Referring to FIG. 3b another embodiment of structures to support accesses to a metaphysical address space is depicted. Here, TLB 325 is still to translate virtual address 301 to a physical address. TLB 325 operates in a similar manner to a lookup table to hold recent translations. In addition, when a recent translation is not found, a virtual address is often translated based on page tables defined in registers of the processing element associated with the TLB. In one embodiment, metaphysical address translation (MAT) buffer 350 is provided for translations of data addresses to metadata addresses for metadata accesses. As an example, MAT buffer 350 operates in a similar manner as TLB 325. MAT buffer 350, in one embodiment, is to translate data address 301 to a metadata address based on metaphysical page tables defined in registers or other information.

Cache lookup logic coupled to translation logic 350 is to determine a hit to a tag entry in response to a tag portion of the metadata address matching a tag value held in the tag entry included in the tag array. Here, a metadata value may also be appended to the address, even when separately translated, to aid in the separation of metaphysical and physical address spaces. As a result, a hit for a data address referenced by a metadata access operation, in this example, includes translation of address 301 to a metadata address through metaphysical translation logic 350 and matching the metadata address to a cache tag in tag array 305. As discussed below, metaphysical address translation logic 350 translates a data address to a metadata address based on a compression ratio.

However, regardless of a translation method, i.e. no modification or translation through separate tables, in one embodiment, metadata to data is compressed. In other words, a compression ratio is an amount of data as compared to metadata. For example, a compression ratio of 8, i.e. 8:1, includes 8 bits of data to 1 bit of metadata or 8 bytes (a quadword) of data to a byte of metadata.

Figure 4:
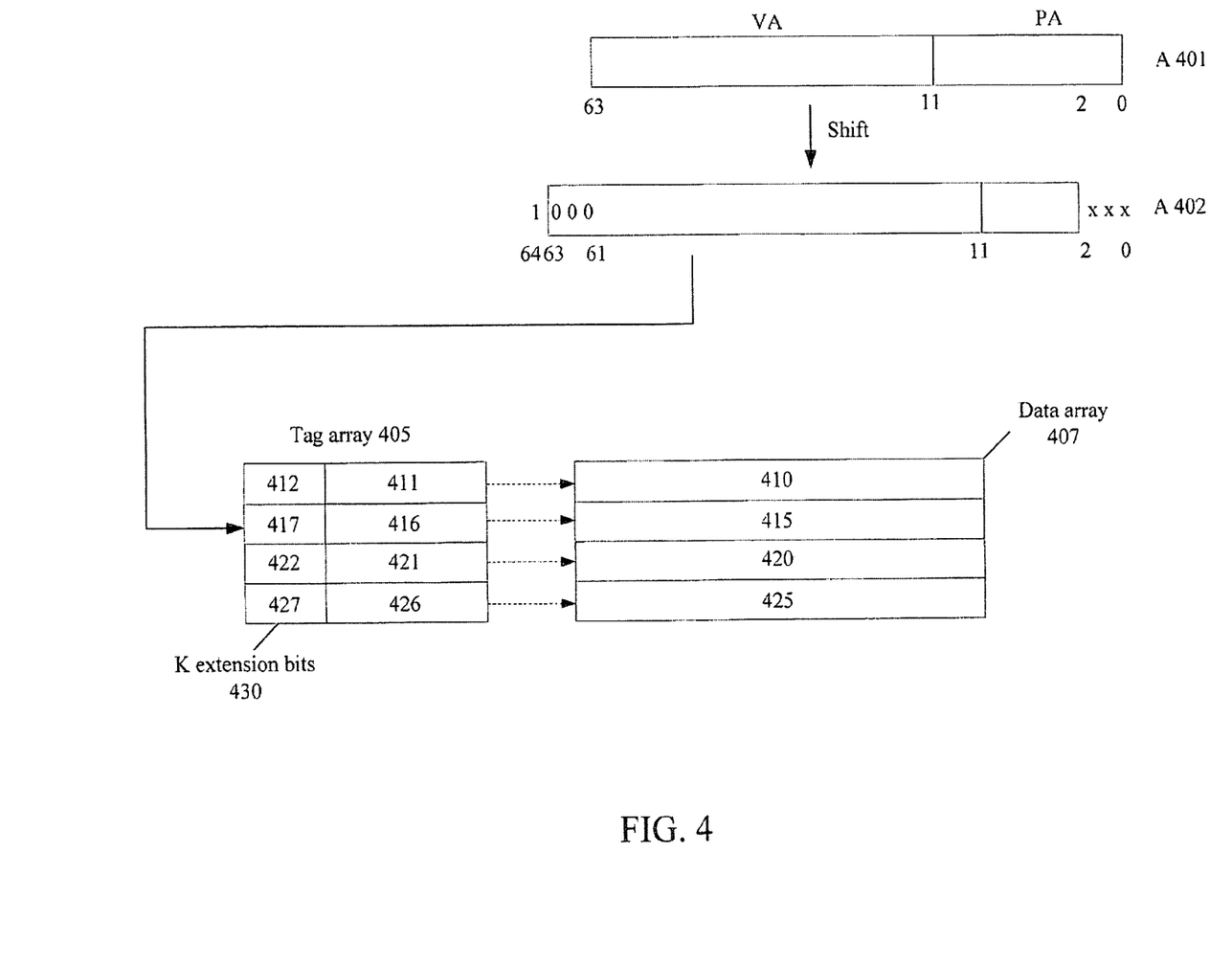
FIG. 4 illustrates an embodiment for compression of data to metadata.

FIG. 4 illustrates an embodiment of a compression ratio of 8 for data to metadata. Control logic is to receive data address 401 referenced by a metadata access operation. For compression, $\log_2(N)$ number of bits is shifted and/or removed, where N is the compression ratio of data to metadata. In the illustrated example, for a compression ratio of 8, three bits are shifted down and removed for metadata address 402. Essentially, address 401 that includes 64 bits to references a specific data byte in memory is truncated by three bits to form the metadata byte address 402 used to reference metadata in memory on a byte granularity; out of which a bit of metadata is selected using the three bits previously removed from the address to form the metadata byte address.

The bits shifted/removed, in one embodiment, are replaced by other bits. As illustrated, the high order bits, after address 401 is shifted, are replaced with zeros. However, the removed/shifted bits may be replaced with other data or information, such as a context identifier (ID) associated with the metadata access operation. Although the lowest number bits are removed in this example, any position of bits may be removed and replaced based on any number of factors, such as cache organization, cache circuit timing, and minimizing conflicts between data and metadata For example, a data address may not be shifted by $\log_2(N)$, but rather address bits 0:2 are zeroed. As a result, bits of the physical address and virtual address that are the same are not shifted as in the example above, which allows for pre-selection of a set and a bank with unmodified bits, such as bits 11:3.

Here, instead of selection of a bit utilizing removed bits 0:2, selection of a bit out of a byte is done using a different three bits, such as a high order three bits. This implementation is potentially timing friendly, however, metadata may not be adjacent to data, i.e. no locality of data to metadata as the higher order tag value is different.

Whether address 401 has bits shifted, removed, or replaced, in one embodiment, address extension tags containing metaphysical values are appended to metadata address 402. As illustrated, the metaphysical value includes a logical one value to indicate address 402 is a metadata address. As stated above, the metaphysical value may include any fixed value defined by hardware, firmware, software, or a combination thereof, such as by a control register or instruction parameter. In addition, as described above, in one embodiment, either shifted and zeroed bits, such as bits 63-65, or additional bits within an extension field including the metaphysical value that are not shown in FIG. 4, are augmented with other information. For example, a processing element ID, such as a core, context, or thread ID, is appended to address 402 as an extension.

Once the appropriate extension bits are appended, then tag array 405 is searched utilizing a tag portion of metadata address 402, which includes the extension field having bit 64. Note for a metadata load/test operation or a write operation, tag array 405 is searched for a matching tag value, i.e. extension bits and a portion of the virtual address included in the tag match between metadata address 402 and a tag entry in tag array 405, such as tag entry 416 including extension field 417.

However, when a write metadata operation misses tag array 405, i.e. metadata has not yet been created, then an entry is allocated in a normal fashion for a cache memory for the metadata. For example, an entry, such as entry 415, is selected, allocated, and initialized to the metadata default value based on metadata address 402 and a cache replacement algorithm, such as a Last Recently Used (LRU) algorithm. As a result, metadata potentially competes with regular data for space.

Figure 5:
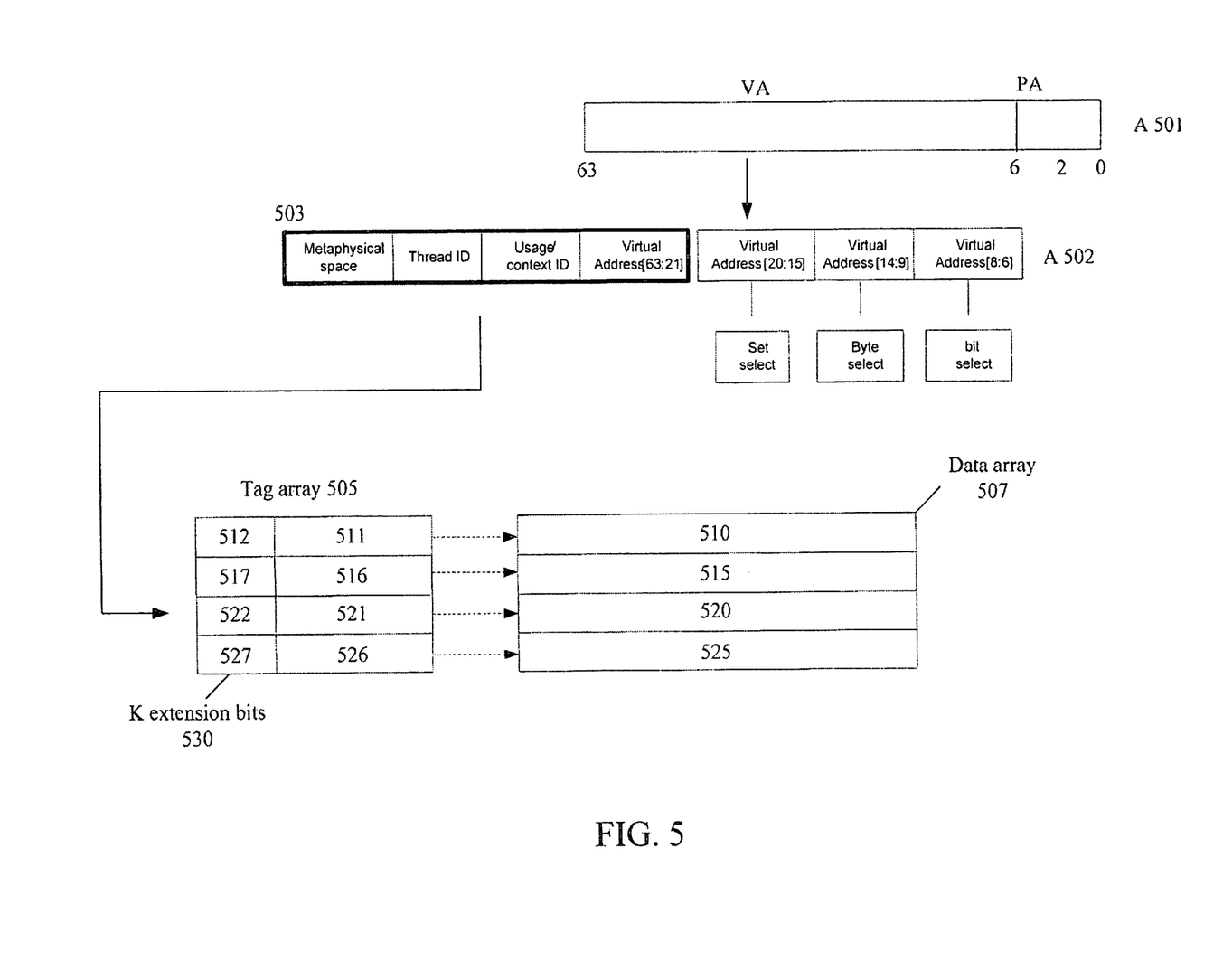
FIG. 5 illustrates another embodiment for compression of data to metadata.

Turning to FIG. 5 another embodiment for compression of data to metadata and utilization of an extension field is depicted. Here, a bit of metadata represents 64 bytes, i.e. a ratio of 512:1. Similar to above, data address 501 is translated/modified to form metadata address 502 through shifting data address 501 down by $\log_2(512)$ bits, i.e. 9 bits. Here, bits 6:8 are still utilized to select a bit, instead of bits 0:2, effectively creating the compression through selection at a granularity of 512 bits. As a result, the remaining portion of the shifted virtual address, i.e. bits 63:21, is utilized as part of tag value 503 of metadata address 502.

However, as address 502 has been shifted by 9 bits, the high order portion of address 502 has 9 open bit locations to hold information. In one embodiment, the 9 bits are to hold identifiers, such as context ID and/or thread ID. In addition, metaphysical space values may also be held in these bits or the address may be extended by the metaphysical space bits. In a similar manner to the searching and replacement described above, tag array 505 is searched with metadata tag 503. Here, if the identifiers and address space do not match, then no hit is found, i.e. a miss is determined. Consequently, this example potentially provides the ability to provide metadata on a thread ID and/or context ID granularity. However, in some implementations an access across IDs may be advantageous, such as when monitor metadata for another thread is to be checked by a thread to determine if an associated data item is monitored by another thread. In this scenario, a mask may be applied to a tag comparison value to allow one thread to hit metadata of another thread.

The shifted address for metadata, in one embodiment, is multiplexed with regular data accesses. Here, the metaphysical space values may be utilized as multiplexer inputs to select between a regular data cache access and a metadata cache access. Additionally, store metadata information may be forwarded to metadata loads in a similar manner to performance of store forwarding in previous implementations. However, in one embodiment, additional limitations are enforced upon metadata addresses, such as preventing forwarding across compression ratios.

In one embodiment, multiple concurrent compression ratios are supported by hardware. Here, a representation of a compression ratio is held in the extension tag bits. As a result, during a search of a tag array, the compression ratio is taken into account. Furthermore, the compression ratio may be tested for determining if a metadata store should forward to a metadata load.

In one embodiment, cache hardware is implemented utilizing a single compression ratio, but includes other hardware support to present multiple compression ratios to software. As an example, assume cache hardware is implemented utilizing an 8:1 compression ratio, as illustrated in FIG. 4. Yet, a metadata access operation to access metadata at different granularities, is decoded to include a micro-operation to read a default amount of metadata and a test micro-operation to test an appropriate part of the metadata read. As an example, the default amount of metadata read is 32-bits. However, a test operation for a different granularity/compression of 8:1 tests correct bits of the 32 bits of metadata read, which may be based on a certain number of bits of an address, such as a number of LSBs of a metadata address, and/or a context ID.

As an illustration, in a scheme supporting metadata for unaligned data for a bit of metadata per byte of data, a single bit is selected from the least significant eight bits of the 32 read bits of metadata based on the three LSBs of a metadata address. For a word of data, two consecutive metadata bits are selected from the least significant 16 bits of the 32 bits of read metadata based on the three LSBs of the address, and continuing all the way to 16 bits for a 128 bit metadata size.

In one embodiment, for the above scheme, a mask is produced by a shift left operation based on metadata address bits passed to it. As an illustration of the mask to produce a shift left operation includes:

8:1 compression: 0xFFFE<<Address[2:0];
16:1 compression: 0xFFFC<<Address[2:0];
32:1 compression: 0xFFF0<<Address[2:0];
64:1 compression: 0xFF00<<Address[2:0];
128:1 compression: 0x0000<<Address[2:0].

This mask is bit-wise logically ORed with the 32 bits of metadata read by load/read micro-operation and the resulting 32 bits are then logically ANDed together to test the metadata/set a flag.

As another implementation example, A single bit for a given data size is utilized—thus not allowing for unaligned data support. In this scheme, a mask is produced by a shift left operation based on a subset of metadata address bits passed to it and processing element ID bits. So, for a bit-per-byte compressed metadata, all the metadata bits are used for each byte. For bit-per-world compressed metadata, only every 2nd bit is used, etc. until only a single bit out of the 32 metadata bits read is used for a 32 byte data operand. As the metadata storage gets more and more sparse for larger data sizes (higher compression rates) there is an opportunity to utilize the extra space to store metadata for multiple contexts side by side, which means that the right metadata bit is selected out of the 32 metadata bits read based on a combination of address LSB bits and context IDs (CIDs).

As an illustration of the mask to produce a shift left operation includes:

8:1 compression: 0x0001 <<00 & Address[2:0];
16:1 compression: 0x0001 <<00 & CID[0] & Address[2:1];
32:1 compression: 0x0001 <<00 & CID[1:0] & Address[2];
64:1 compression: 0x0001 <<00 & CID[2:0];
128:1 compression: 0x0001 <<0 & CID[3:0];
256:1 compression: 0x0001<<CID[4:0].

The mask is bit-wise logically ANDed with the 32 bits of metadata read by the first micro-operation and the resulting 32 bits are logically ORed together to test the metadata and potentially set a flag.

Figure 6:
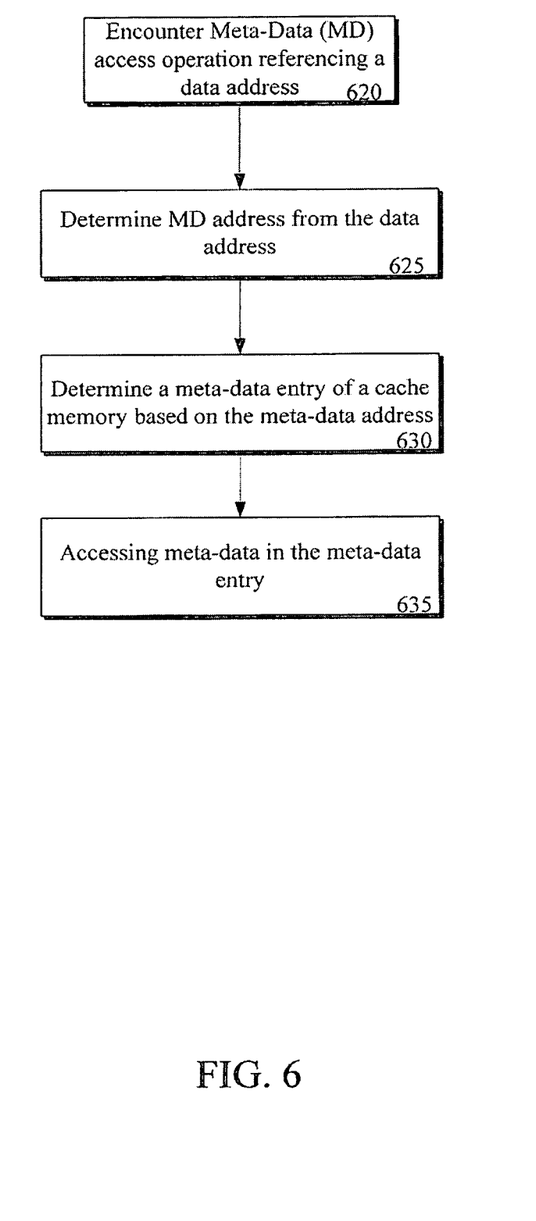
FIG. 6 illustrates a flow diagram for a method of accessing metadata for data.

Referring to FIG. 6 a flow diagram for a method of accessing metadata for data is illustrated. Although the flows of FIG. 6 are illustrated in a substantially serial fashion, the flows may be performed at least partially in parallel, as well as potentially in a different order. In flow 620 a metadata operation referencing a data address for a given data item is encountered. Examples of metadata operations includes load/test and store/write/clear operations or micro-operations. However, meta-data access operations may be either explicit software instructions/operations to access metadata as well as implicit micro-operations decoded as part of a larger more complex instruction, such as an access to the data item implicitly requiring an update of associated metadata. Additionally, implementations may opt to bulk-clear all metadata for a given context, thread or processor based on certain system events such as protection ring transition, transition into a different processor operating mode, or a remapping of memory pages.

A metadata address is determined from the referenced data address.

Examples of determining a metadata address include:
(1) translating the data address to a data address utilizing normal data virtual to physical address translation and appending a metaphysical extension to the data address to form the metadata address;
(2) appending a metaphysical extension to the virtual data address to form the metadata address;
(3) translating the data address to a physical metadata address utilizing metaphysical translation table logic and appending a metaphysical extension to the physical metadata address to form the metadata address.

Furthermore, the translation may incorporate, i.e. be based on, a compression ratio of data to metadata so as to separately store metadata for each compression ratio.

In flow 630 a metadata entry of the cache memory is determined based on the metadata address. As an example, a tag portion of the metadata address is utilized to search a tag array. If the tag portion including the metaphysical values does not match a tag entry, then a miss occurs. In one embodiment, instead of issuing a snoop request to service the cache miss, the miss is serviced locally without requests outside the cache domain, as the metadata is lossy metadata only held in the cache memory. As a result, an entry is allocated according to normal cache allocation policy with the appropriate metadata tag held in the entry and the data storage element is initialized with the default metadata value. Consequently, the locality and timing of metadata with regard to associated data items is potentially improved as well. In contrast, if a hit occurs the metadata entry is directly determined.

Whether the determining the entry is determined through a hit or miss and allocation of the entry, the metadata is accessed, appropriately. For example, for a load or test operation, the metadata is read. In contrast, for a store operation, the metadata is updated in the corresponding metadata entry. Therefore, as can be seen, metadata may be held in a lossy manner within a local cache memory without annotation of bits to a data array of the cache memory or expensive additional storage structures. Furthermore, metadata may be held in a compressed manner, i.e. a compression ratio of data to metadata. Hardware may implement a single or multiple compression ratios, and in either case, present multiple compression ratios to software.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a cache memory; and
   logic coupled to the cache memory to
      receive at least a portion of an address to reference a data item;
      associate the portion of the address with a metaphysical extension, wherein the metaphysical extension includes only a single metaphysical identifier bit which when set indicates that a cache line of the cache memory has metadata associated with a data item and an address space identifier bit per processing element of the processor; and
      determine a metadata entry of the cache memory to access metadata associated with a data item held in a data item entry of the cache memory based on the address and the metaphysical extension.

2. The processor of claim 1, wherein the logic to receive at least a portion of the address to reference the data item is in response to control logic receiving a metadata access operation referencing the address.

3. The processor of claim 1, wherein the logic to associate the portion of the address with the metaphysical extension comprises the logic to append the metaphysical extension to a Most Significant Bit (MSB) of the portion of the address.

4. The processor of claim 3, wherein the plurality of metaphysical extension bits each correspond to a separate metaphysical address space.

5. The processor of claim 1, wherein the metadata associated with the data item is to be lost upon an eviction of the metadata entry from the cache memory, and wherein the metadata includes attributes for the data item.

6. A method comprising:
   encountering a metadata operation referencing a data address for a data item held in a data entry of the cache memory;
   determining a metadata address from the data address by translating the data address using virtual to physical address translation and appending a metaphysical extension to the data address to form the metadata address, wherein the metaphysical extension includes only a single metaphysical identifier bit which when set indicates that a cache line of the cache memory has metadata associated with a data item and an address space identifier bit per processing element of the processor;
   determining a metadata entry of the cache memory based on the metadata address; and
   accessing metadata in the metadata entry in response to determining the metadata entry, wherein the metadata is a location of backup data for the data item.

7. The method of claim 6, wherein determining the metadata address from the data address comprises translating the data address to a physical metadata address utilizing metaphysical translation table logic and appending a metaphysical extension to the physical metadata address to form the metadata address.

8. The method of claim 7, wherein translating the data address to a physical metadata address utilizing metaphysical translation table logic is based on a compression ratio of data to metadata.

9. The method of claim 6, wherein the metadata operation includes a store metadata operation to store new data and accessing metadata in the metadata entry includes storing the new metadata to the metadata entry.

10. The method of claim 6, wherein the metadata operation includes a load metadata operation to load the meta-data and accessing metadata in the metadata entry includes loading the metadata from the metadata entry.

11. A processor comprising:
a cache memory; and
logic coupled to the cache memory to
receive an address to reference a data item;
associate the address with a metaphysical extension, wherein the metaphysical extension is a single metaphysical identifier bit, which when set indicates that a cache line of the cache memory has metadata associated with a data item and a plurality of processing element identifier bits, wherein the logic to associate the portion of the address with the metaphysical extension comprises the logic to append the metaphysical extension to a Most Significant Bit (MSB) of the portion of the address; and
determine a metadata entry of a cache memory to access metadata associated with a data item held in a data item entry of the cache memory based on the address and the metaphysical extension.

12. The processor of claim 11, wherein the logic to receive the address to reference the data item is in response to control logic receiving a metadata access operation referencing the address.

* * * * *